Patented Dec. 23, 1952

2,623,032

UNITED STATES PATENT OFFICE 2,623,032

TWO-STAGE EMULSION POLYMERIZATION PROCESS

Fred W. Banes and Erving Arundale, Westfield, N. J., assignors to Standard Oil Development Company, a corporation of Delaware No Drawing. Application December 29, 1948, Serial No. 68,077

10 Claims. (Cl. 260—45.5)

This invention relates to blended plastic materials compositions and to a method of preparing such blends. In particular the invention relates to oil-resistant diolefin-nitrile type rubber blends of improved processing characteristics and to a method of forming such blends in a polymerization step.

Diolefin-nitrile type rubbers have been accepted in the art as one of the prototypes of oil-resistant synthetic rubber possessing an excellent combination of properties. However, major disadvantages of these rubbers known to the prior art have been their inferiority in processing characteristics, poor plasticity, insufficient tackiness for laminating purposes such as the making of tires from plies, and rather poor low temperature performance. In the past some of these undesirable properties have been blamed on the fact that the copolymer prepared by the usual emulsion polymerization technique was not truly homogeneous because of the somewhat different polymerization rate of the nitrile as compared with the rate of the diolefin. Thus it has been known, for example, that when about 74 parts of butadiene and 26 parts of acrylonitrile are copolymerized by the conventional emulsion technique, the copolymer formed in the first stages of the polymerization contains about 32% of combined nitrile whereas the fractions of copolymer formed near the end of the polymerization period contain about 24% of nitrile. Products of this type are rather difficult to process on rubber mills and other common rubber machinery.

It has been proposed previously to improve the properties of such copolymers by making their composition more truly uniform. To achieve such uniformity it has been suggested that as the original mixture of monomers is gradually being polymerized, incremental portions of one of the monomeric ingredients of the polymerizable charge should be added during the course of the polymerization to keep the ratio of unreacted monomers constant. By this gradual addition the uniformity of composition of the resulting copolymer could indeed be improved almost to perfection depending on frequency of addition and the size of the incremental amounts of ingredients added. In spite of this improved uniformity or homogeneity, however, the improvement in characteristics of the resulting copolymers obtained thereby has been rather disappointing, except for a noticeable improvement in oil resistance. In particular, especially in the case of copolymers having up to about 30% nitrile content, the processing characteristics of such homogeneous copolymers proved to be no better than those of less homogeneous copolymers prepared in the ordinary method wherein all polymerizable materials are usually charged at the outset of the reaction.

A specific object of this invention is to provide the art with oil-resistant rubbers possessing greatly improved processing characteristics such as decreased breakdown and mill-banding time, shorter compounding time and reduced elastic swell on extrusion. Another particular object is to produce improved blends of synthetic rubbers by a novel polymerization method. A more general object is the preparation of blends of polymeric plastics in a polymerization step. Still other objects will become apparent from the subsequent description.

In contrast to the teachings of the prior art, it has now been discovered that homogeneity of polymer composition is not necessarily desirable and that polymers of very much better processibility, abrasion resistance or other properties can be obtained by deliberately preparing a product of markedly non-uniform chemical composition. In particular, superior polymers are obtained by carrying out the polymerization in such a fashion that a substantial fraction of polymer formed at one stage of the polymerization reaction should have a distinctly different composition from another fraction of polymer formed at a different stage of the same polymerization reaction. The novel polymerization method devised for achieving this purpose will be referred to hereafter by the term "co-synthesis." The result of this novel method is that the polymer recovered after the termination of the reaction is in essence a blend containing at least two widely different polymer fractions, of which one may consist essentially of combined diolefin, while another fraction may be a copolymer of diolefin with a substantial proportion of nitrile, for example. These heterogeneous copolymers will hereafter be referred to as "co-synthesis polymers" or "sympolymers," as distinguished from related copolymerization products prepared from the same or similar constituents by previously known methods.

The monomers particularly suited for the present invention are of two types. One is a conjugated diolefin of 4 to 6 carbon atoms such as butadiene, piperylene, isoprene, 2,3-dimethylbutadiene, 2-methyl pentadiene, n-hexadiene, cyclopentadiene, methyl cyclopentadiene, cyclohexadiene and the like. Where easily processable polymers of substantial oil resistance are desired, the other monomer is preferably an acrylic nitrile of the formula $CH_2:CR.CN$ such as acrylonitrile, methacrylonitrile, ethacrylonitrile and chloracrylonitrile.

However, the novel "co-synthesis" method is not limited to diene-nitrile copolymers but is also applicable to the emulsion polymerization of other monomers. Thus, all or part of the nitrile monomer may be replaced by some other compound copolymerizable with the diolefin. For example, styrene, vinylidene chloride, vinyl chloride, methyl acrylate, methyl methacrylate and other acrylic esters, vinyl ethers such as vinyl isobutyl ether, vinyl ketones and other ethylenically unsaturated monomers may be used. Polyolefinic monomers such as chloroprene may also be copolymerized with a diolefin hydrocarbon such as butadiene by the co-synthesis method. On the other hand, it will be understood of course that while the major improvement obtained by the use of the novel co-synthesis method in the preparation of diene-nitrile copolymers is the entirely unexpected improvement in processing characteristics, the application of co-synthesis to other monomeric systems may bring about still other product improvements, such as increased abrasion resistance or better resistance to heat, light or chemical agents. In the preferred embodiment of the invention the overall weight ratio of diene to nitrile combined to form the novel sympolymers may vary between about 100/10 and 100/80, the preferred ratio being between 100/20 and 100/50.

In accordance with the invention all or at least a substantial portion of the diene to be used in the polymerization is emulsified in one-half to five times, or preferably 1.5 to 3 times of its volume of aqueous medium such as water. None or at most up to about 5% of nitrile based on the total amount of diene monomer to be used in the run should be present in the initial monomer charge. For example, when the aqueous medium containing small amounts of nitrile is recycled for re-use in the polymerization step after completion of a polymerization cycle and separation of polymer and most unreacted monomers therefrom, it may be convenient to retain up to about 2 to 5 parts of nitrile per 100 parts of butadiene in the initial charge without adverse effect. In fact, the presence of such small amounts of nitrile in the initial charge is advantageous in that it acts as a mild activator and also as a solvent aid for the mercaptan usually present in such polymerization. However, the presence of these small amounts of nitrile in the initial charge is a matter of convenience only and does not affect the properties of the final product.

With the exception of the relatively minute amount just mentioned, all of the nitrile monomer, preferably from 15 to 60 parts of nitrile based on 100 parts of diene, with or without additional diolefin, is added to the reaction in one step or in one portion only after 10 to 80%, but preferably 15 to 35% of the original monomer charge consisting essentially of diolefin had been converted into an oily or rubbery polymer. For example, one may start with an emulsified charge containing 100 parts of butadiene and 4 parts of acrylonitrile, and after this charge had been polymerized to about 20% conversion 30 parts of acrylonitrile are added thereto and the reaction continued to a conversion of 75% based on total monomers. Or one may start with a charge containing 15 parts of emulsified butadiene and about 1 part or less of nitrile, and after this charge had been polymerized to about 80% conversion 85 parts of butadiene and 20 parts of acrylonitrile are added thereto and the reaction continued to a conversion of about 70 to 85% based on total monomers. Still other variations in monomer addition can be adopted within the scope of the invention.

In preparing the emulsion for polymerization, any of a great variety of known emulsifying agents may be used. Most commonly about 0.5 to 5 parts of an alkali soap of a saturated or unsaturated $C_8$ to $C_{24}$ fatty acid such as caprylic, carnaubic, lauric or mixed coconut oil acids are used, sodium or potassium oleate or stearate, or the corresponding ammonium soaps being usually preferred. Often it is desirable to have a slight excess of free fatty acid or free alkali in the emulsion. For example, the soap may be prepared in situ by neutralizing oleic acid with about nine-tenths of an equivalent of sodium hydroxide. In addition to or in place of the fatty acid soap, another emulsifier such as Daxad-11 (sodium salt of a formaldehyde condensation product of naphthalene sulfonic acids) or sodium lauryl sulfate, sodium tetraisobutylene sulfonate, or aromatic alkyl sulfonate salts, etc., may be used to advantage.

The polymerization may be carried out at temperatures ranging from about −20° C. to +60° C., temperatures between 30° C. and 50° C. being preferred. Polymerizations at temperatures between −20° C. and +20° C. are hereafter referred to as "low temperature polymerization." When the polymerization temperature is below the natural freezing temperature of the aqueous emulsion, it is necessary to add to the emulsion a sufficient amount of an anti-freeze agent to prevent the reaction mixture from freezing. Suitable anti-freeze agents are saturated mono- or polybasic aliphatic alcohols of 1 to 3 carbon atoms, such as methanol, ethanol, ethylene glycol, propylene glycol or glycerine. Ordinarily the polymerization times may vary between about 5 and 48 hours depending on temperature, degree of conversion desired, catalyst system and other known variables in the polymerization procedure, times of about 10 to 15 hours being ordinarily preferred. The total reaction may be carried to a conversion of about 50 to 100%, preferably 65 to 85%.

The catalyst used may be any one or a mixture of the known class of per type or oxygen-liberating catalysts used in emulsion polymerization such as hydrogen peroxide, benzoyl peroxide, cumene hydroperoxide, tertiary butyl hydroperoxide, potassium persulfate or other alkali persulfates or perborates or the corresponding ammonium salts. The oxygen-liberating catalyst is used in amounts ranging from about 0.03 to 2% based on the weight of monomer, catalyst concentrations ranging from 0.3 to 0.5% of potassium or other alkali persulfate being preferred for polymerizations carried out above room temperature while concentrations of about 0.05 to 0.3% of the more reactive organic peroxides such as cumene hydroperoxide are preferred in low temperature polymerizations.

Furthermore, a total of 0.5 to 1.5 parts (based on 100 parts of monomer charged) of a primary or tertiary aliphatic mercaptan having at least 6 and up to about 18 carbon atoms, e. g., hexyl, dodecyl, tetradecyl or octadecyl mercaptan, or mixtures of $C_6$ to $C_{18}$ mercaptans, or other modifiers such as diisopropyl dixanthogen disulfide, are likewise beneficially present in the reaction mixture to modify the polymerization so as to obtain polymers of lower Mooney viscosity. All of the modifier may be added to the emulsion at the beginning, but it is preferred to add only about 0.2 to 0.8 part to the initial diolefinic charge and to introduce further amounts later, e. g. 0.1 to 0.5 part at the time of the nitrile addition and another 0.1 to 0.5 part when total conversion has reached about 40 to 70%. As an alternative, the modifier may also be added continuously.

Other factors whereby the molecular weight of the product, reaction rate, or both, may be effected are polymerization temperature, monomer ratio, conversion, etc., as is well known per se. Furthermore, activation of the polymerization reaction may be accomplished by carrying out the polymerization in a so-called redox system such as is described, for example, in Industrial and Engineering Chemistry, vol. 40, pp. 770, 772, 773–777 and 932–937 (1948).

The final rubbery sympolymer products of the present invention may have a Mooney viscosity between about 20 and 200, preferably 50 to 150, or an intrinsic viscosity between about 0.2 and 3.0. On the other hand, the polydiene polymers prepared in the first phase of the novel polymerization method, being in the nature of intermediate products, may be plastic, putty-like to rubbery in character depending on the particular polymerization conditions selected and may have a Mooney viscosity between about 1 and 50, corresponding to an intrinsic viscosity of about 0.5 to 2.2 and a molecular weight of about 20,000 to 200,000.

The molecular weight M of these intermediate polydiene polymers may be approximately calculated from the intrinsic viscosity $i_v$ by the following equation: $i_v = 11 \times 10^{-4} \times M^{0.62}$. However, because of the extremely complex composition of the final sympolymer product, no satisfactory equation has been found for calculating the molecular weight of the complex sympolymer from its intrinsic viscosity.

It has not been definitely established to what extent these first-formed polydienes polymerize further when the nitrile has been added to the partially polymerized initial reaction mixture, but there are indications that at least some of the polydiene chains are sufficiently reactive to either attach a nitrile terminal group or join with subsequently formed copolymers of diene and nitrile. Moreover, it appears that the after-reactions of the polydiene chains are favored by relatively low reaction rates, i. e. by relatively low temperatures following the addition of nitrile to the reactor. It is assumed that these after-reactions are responsible for the superior oil resistance of the novel sympolymers as opposed to blends of equal over-all nitrile content obtained by mechanical blending of polybutadiene rubber and an ordinary butadiene-acrylonitrile rubber. It is believed to be indicative of the after-polymerization of the first formed polydiene that the novel sympolymers are quite unexpectedly characterized by a completely homogeneous appearance under a phase microscope whereas blends of separately polymerized polydiene and diene-nitrile rubbers give phase photomicrographs showing a grainy or heterogeneous appearance indicative of incomplete miscibility, no matter how intimately blended on a mill or even in latex form.

A convenient method for obtaining phase photomicrographs is as follows. The rubber samples are cut to produce strips 5 mm. x 5 mm. x 1 cm. These strips were placed in embedding blocks which were filled with pure paraffin having a melting point of 53° C. The paraffin was hardened in ice water, trimmed to orient the rubber specimen, and mounted on the carrier of a Spencer rotary microtome. The blade was set at approximately 20 degrees to the specimen face and sectioning was done at 12μ, one slice at a time; no ribbon was produced. The section was lifted with a camel hair brush and mounted on a clean slide. Immersion oil and a coverslip were used and photomicrographs of 450X magnification were taken with a 4 mm. 20A +.25 phase objective.

In any event, however, it is to be understood that the invention is not claimed to be based on the presence or absence of any such after-reactions of the first-formed polymers and it is to be understood further that the improved properties of the novel products are characteristically inherent in the described method, regardless of the eventual polymerization mechanism which may underlie that method.

The following examples are illustrative of the claimed invention, though it will be understood that the invention is not limited thereto.

EXAMPLE 1

*Initial polymerization mixture*

| | |
|---|---:|
| Butadiene | 73 |
| Acrylonitrile | 2.5 |
| Daxad-11 [1] | 2.85 |
| Sodium oleate | 1.00 |
| Lorol mercaptan | .35 |
| Potassium persulfate | .30 |
| Water | 200 |

[1] Na salt of formaldehyde concentration product of naphthalene sulfonic acids.

The initial polymerization mixture specified above was charged to a reactor and heated at 45° C. for a period of 6.5 hours, at the end of which time 20 percent of the butadiene charged was converted to a rubbery polymer. At that point 24.5 parts of acrylonitrile and 0.175 part of Lorol mercaptan (a mercaptan mixture consisting of a major proportion of lauryl mercaptan and minor amounts of other aliphatic mercaptans in the $C_6$ to $C_{18}$ range) were added to the reactor, the reaction temperature was reduced to 35° C. and the heating continued at that level for 10 more hours until a final conversion of 75% was reached. An intervening addition of 0.175 part of Lorol mercaptan also was made 11 hours after the start of the run at which point the total conversion of all monomers charged was at about 50%.

The resulting sympolymer latex was discharged from the reactor, stabilized with 0.1 part of hydroquinone and 1.5 parts of phenyl beta naphthylamine, coagulated with brine and dilute acetic acid in the usual manner and separated. The coagulate was dried in crumb form, in a circulating oven at 80° C. for a period of about 8 hours. The dry rubbery polymer was found to have a combined average nitrile content of 28% and a two-minute Mooney viscosity of 92.

When this sympolymer was placed on a 6" x 12" laboratory mill and milled under standard conditions (135 grams of polymer, mill rolls set at 0.018" clearance and mill roll temperature controlled at 38±3° C.), a hole-free band formed immediately on the first pass through the rolls. The milling time required to transform a polymer into a hole-free band will be referred to hereafter as "band time."

Within one to two minutes of further mill mastication the polymer was sufficiently plastic to form a smooth glossy sheet with an active rolling bank. In fact, when the mill was stopped at this point, the stock remained on the roll as a continuous band without pulling apart, indicating complete plasticization in two minutes of milling. Thereafter carbon black and other compounding ingredients in the amounts shown in Example 6 were rapidly received by the sympolymer stock and a uniform mix was obtained with surprising ease, 50 parts of black having been added and dispersed in 2.5 minutes.

In contrast, a commercial butadiene-acrylonitrile rubber having a two-minute Mooney viscosity of 87 and a combined nitrile content of 28.6%, prepared by direct emulsion polymerization of the required proportion of monomers in accordance with the normal emulsion technique where all monomers are added at the start, began to form a continuous band only after milling for 5 minutes under the above conditions. When the mill rolls were stopped at this stage the polymer pulled apart on the roll indicating a relatively low degree of plasticity and an undesirably high degree of residual elasticity. The black addition took 8 minutes as opposed to only 2.5 minutes required by the comparable sympolymer.

EXAMPLE 2

A run was made in which the charge was identical with that described in Example 1 except that the system was activated with potassium ferricyanide (0.1 part on monomers). In this case a solution of the ferricyanide and a solution of the potassium persulfate catalyst were mixed and heated to 50° C. before charging. The polymerization reached 23 percent conversion in 5.25 hours at 45° C. whereupon the remainder and bulk of the acrylonitrile (24.5 parts) was added to the system. The reaction was then continued for 4.5 hours at 30° C. at which time 75% conversion had been attained. The properties of the polymer and vulcanizates prepared therefrom were the same as have been obtained with the polymer whose preparation was described in Example 1.

In this connection, it is especially interesting and surprising to observe that whereas potassium ferricyanide activation is known to be entirely ineffective in ordinary butadiene-acrylonitrile copolymerizations, it was found to be effective not only for the butadiene homopolymerization phase, which would be expected, but also exceedingly effective for the butadiene-acrylonitrile copolymerization step of the invention, especially when the activating agent was added to the initial charge.

EXAMPLE 3

The polymers of the invention can also be prepared in especially superior form by carrying out the co-synthesis at low polymerization temperatures by using a properly activated system. This is shown by the following data:

The polymerization data given above indicate that the system may be activated by minor changes in the polymerization recipe and that use of rosin acid soaps is not detrimental to the polymerization process.

The polymer of this example, having a Mooney viscosity of 45 and an acrylonitrile content of 26.6%, banded immediately on the mill and required a total milling time of less than two minutes to give a completely plasticized, glossy product. In comparison, a conventional copolymer, having a Mooney viscosity of 50 and an acrylonitrile content of 28%, began to form a continuous band only at the end of one minute on the mill and even after fifteen minutes of mastication the banded polymer was still rough, dull and "pebbly." This difference is behavior once again emphasizes the greatly superior processing characteristics of the novel sympolymers.

EXAMPLE 4

A polymer was prepared according to the procedure described in Example 3 except that the polymer was intentionally made soft and plastic (24 Mooney viscosity), the increased plasticity having been achieved by raising the total mercaptan concentration of the polymerization mixture to 0.53 part. The resulting product again exhibited the superior mill behavior characteristic of the polymers of the invention.

EXAMPLE 5

Comparable polymers having a total average nitrile content of about 22% were prepared in accordance with the invention and the prior art, respectively. The polymerization recipes and conditions were as follows:

| Initial charge (in grams) | Prior art copolymerization | Invention (co-synthesis) |
|---|---|---|
| Water | 200 | 200 |
| Oleic acid | 1.0 | 1.0 |
| NaOH (for 92% neutralization) | .13 | .13 |
| Daxad-11 | 2.85 | 2.85 |
| Acrylonitrile | 21 | 2.5 |
| Lorol mercaptan | .4 | .4 |
| $K_2S_2O_8$ | .3 | .3 |
| Butadiene | 79 | 78 |
| Additional charge: | | |
| At 23% conversion— | | |
| Lorol mercaptan | .2 | .2 |
| Acrylonitrile | None | 19.5 |
| At 50% conversion—Lorol mercaptan | .2 | .2 |
| Polymerization conditions: | 12 hours at 35° C. | 7 hours at 45° C. 8.5 hours at 35° C. |
| | | 15.5 hours. |
| | (75% total conversion) | (75% total conversion) |

*Polymerization charge (parts by weight)*

| Initial | | Additions to reactor | | | |
|---|---|---|---|---|---|
| | | 25% conversion | | 50% conversion | |
| Butadiene | 73 | Acrylonitrile | 27.0 | t-$C_{12}$ mercaptan | 0.133 |
| Acrylonitrile | 0.0 | t-$C_{12}$ mercaptan | 0.133 | | |
| Dresinate 731 | 4.5 [1] | | | | |
| Sodium Hydroxide | 0.2 | | | | |
| Ferric pyrophosphate | 0.27 | | | | |
| $Na_4P_2O_7.10H_2O$ | 1.00 Activator solution [2] | | | | |
| Dextrose | 2.00 | | | | |
| Cumene hydroperoxide | 0.10 | | | | |
| t-$C_{12}$ Mercaptan | 0.20 | | | | |
| Water | 200.0 | | | | |

Polymerization:
4.5 hours at 10° C.—25% conversion.
Then 11.0 hours at 10° C.—75% conversion.

[1] Parts as active ingredient. Dresinate 731 is an aqueous paste of about 64% solids, the solids being the sodium salt of dehydrabietic acid, acid number 12.5.
[2] The activator solution was prepared by freshly making up and mixing the separate solutions ½ hour before charging, heating the mixed solutions to about 60° C. for 10 minutes, then cooling to 10° C. prior to charging.

The evaluation of the products resulting from the above polymerization runs is tabulated in Example 6, runs D and H respectively, whence it will be seen that the invention is fully effective even for the preparation of sympolymers of relatively low nitrile content.

EXAMPLE 6

In order to show that the outstanding processing properties of the sympolymers described in the preceding examples were not obtained at the expense of the quality of the vulcanized end product, the sympolymers of Examples 1, 3, 4 and 5, as well as comparable conventional commercial polymers of the type described at the end of Example 1 were compounded for vulcanization as follows: Polymer 100.0 parts; M. P. Channel Black (Kosmobile 66) 50 parts; zinc oxide 5.0 parts; stearic acid 1.0 part; sulfur 1.5 parts; and benzothiazyldisulfide 1.0 part. Before curing samples of the compounded stocks were subjected to an extrusion test so as to determine their extrusion properties which give a dependable indication of the plasticity of the products tested. The main portions of the compounded stocks were cured for 45 minutes at 141° C. and vulcanizates of the properties shown below were obtained:

| Run | Polymers of invention | | | | Comparative polymers | | | |
|---|---|---|---|---|---|---|---|---|
| | A | B | C | D | E | F | G | H |
| Source of polymer tested | Example | | | | Prior art polymerization method | | | |
| | 1 | 3 | 4 | 5 | | | | |
| Mooney viscosity | 92 | 45 | 24 | 78 | 87 | 50 | 24 | 75 |
| Acrylonitrile content, percent | 28.0 | 26.6 | 28.2 | 22.2 | 28.6 | 28.0 | 27.5 | 21.5 |
| Extrusion of uncured compound [1]: | | | | | | | | |
| Rate, in./min | 50.5 | 66 | 94.5 | 62.5 | 32 | 39 | 36 | 47 |
| Unit wgt., g./in | 1.87 | 1.88 | 1.85 | 1.93 | 2.73 | 2.67 | 3.50 | 2.51 |
| Unit vol., cc./in | 1.95 | 1.96 | 1.93 | 2.05 | 2.84 | 2.78 | 3.64 | 2.61 |
| Elastic swell, percent | 117 | 118 | 114 | 128 | 217 | 208 | 304 | 168 |
| Appearance of extruded tube | Smooth, glossy | | | | Rough, pebbly | | | |
| Vulcanizate properties: | | | | | | | | |
| Tensile, lbs./sq. in. | 3,500 | 3,565 | 3,575 | 3,485 | 3,835 | 3,075 | 2,600 | 3,490 |
| Elongation, percent | 615 | 600 | 595 | 500 | 560 | 610 | 620 | 590 |
| 300% modulus, lbs./sq. in. | 1,570 | 1,000 | 1,190 | 1,840 | 1,390 | 1,900 | 800 | 1,040 |
| Solvent resistance [2] vol. increase, percent | 46 | 48 | | 63.6 | 43 | -43 | | 72.5 |

[1] The uncured polymer compound was tubed by extrusion through a Royle extruder at 220° F., 80 R. P. M., using a 0.400" diameter die and a 0.300" diameter core. According to these dimensions, the polymer in a one-inch length of extruded tube, if perfectly plastic and non-swelling, should have a unit volume V of 0.90 cc. and a unit weight W of 0.87 gram. Hence the volume percent of extrusion swell S of a tube having a unit volume V cc./in. is calculated from the formula $$S\% = \frac{V - .90}{.90}$$

[2] 48 hour immersion at room temperature in solvent consisting of 20% aromatics (benzene, toluene, xylene) and 80% diisobutylene.

The sympolymers of the invention can be seen to have tensile properties substantially as good as those of comparable conventional copolymers. Even their oil resistance is surprisingly good as shown by a volume increase only slightly larger than that of the conventional polymers, and this despite the fact that the sympolymers necessarily contain a substantial fraction of molecules consisting essentially of polydiolefin. On the other hand the plastic or processing properties of the polymers of the invention are far superior to those of the conventional polymer as reflected not only by the milling characteristics described in the previously examples but also by very much greater extrusion rates, smoother appearance and by a much lower extrusion swell, the latter being a practical measure of the elastic force which causes undesirable deformation of the extruded tube after its exit from the extruder die. The improvement in extrusion rate and reduction of elastic swell becomes particularly remarkable with sympolymers of low viscosity, as shown by a comparison of runs C and G which indicate that sympolymers of the same softness as comparable with ordinary copolymers are much more truly plastic in the uncured state than the latter. Extrusion tests on a large number of various samples have shown that the novel sympolymers have an extrusion swell of about 100 to 130% over the ideal volume corresponding to actual die dimensions whereas ordinary direct synthesis copolymers of the prior art have an extrusion swell of at least 150%, usually between 200 and 300%.

In summary, a novel polymerization technique has been found which permits the preparation of easy processing dienenitrile polymers during a single reaction and without need for subsequent addition of extraneous plasticizing agents. The reaction may be carried out effectively at temperatures between —20° C. and +60° C., minor adjustments in composition of the polymerization charge allowing flexible control of the reaction rate. For instance, while polymerizations at temperatures above 30° C. need no special activation, at temperatures below 30° C. it is desirable to increase the reaction rate by adding to the emulsified polymerizable charge an activator solution, a particularly useful activator for systems catalyzed with cumene hydroperoxide being a solution containing about 0.015 to 0.035 part (per 100 parts of monomers) of ferrous sulfate heptahydrate, 0.5 to 1.5 parts of sodium pyrophosphate decahydrate and 1.0 to 3.0 parts of reducing sugar or other poly basic alcohol such as dextrose, fructose, invertose, polyglycols, diacetone alcohols, etc. Still further activation may be obtained as shown in Example 3 by substituting about 0.20 to 0.35 part of ferric pyrophosphate for the ferrous sulfate just mentioned. Activation by other agents, for example, diazothioethers such as tolyl diazothiobetanaphthol may be used also.

Another method available for activation of the polymerization of the invention involves the use of about 0.1 to 0.15 part of potassium ferricyanide with the usual 0.3 to 0.5 part of potassium persulfate catalyst (per 100 parts of monomers). The surprising effectiveness of this type of activation has already been described in Example 2 hereof.

On the other hand the rate may be decreased by reducing the sugar concentration or by substituting all or part of the usual faty acid or rosin acid soap by a synthetic emulsifier such as polymerized sodium salts of short-chain alkyl naphthalene sulfonic acids (Daxad-11) or sodium lauryl sulfate (Orvus). For example, since butadiene alone polymerizes at a much slower rate than does a mixture of butadiene and acrylonitrile, and since a uniform rate of reaction at one temperature level is preferred throughout each polymerization run, it is sometimes advantageous to add a small amount of synthetic emulsifier with the acrylonitrile monomer at the end of the polybutadiene phase of the co-synthesis. Alternatively, a uniform rate of polymerization can be achieved both during the polybutadiene phase and the subsequent butadiene-acrylonitrile copolymerization phase by carrying out the latter at a temperature about 10 to 15° C. lower than the former, as illustrated in Example 1. As mentioned previously, a relatively slow rate of reaction during the copolymerization phase is also desirable in order to promote what appears to be a reaction of nitrile with the polydiene molecules formed during the first phase.

The polymerization technique of the invention permits the preparation of easy processing diene-nitrile polymeric rubbers during the course of a single reaction. The new rubbers are composed of at least two types of polymeric molecules, one type being a copolymer of diene with about 10 to 50% of nitrile, and the other type present being composed essentially of long polydiene chains as such and apparently also of polydiene chains with nitrile groups attached at the ends thereof, as well as polydiene chains combined with copolymer fragments containing both nitrile and diene. The inherent ease with which the novel rubbers band on a mill within an unusually short time, often within a period of less than 0.5 minute, break down, extrude, and take up compounding ingredients such as fillers or plasticizers is a matter of paramount importance in rubber fabrication processes since this improvement in rubber processing represents a very substantial saving in mechanical power and labor, and allows the use of rubber mills and other processing equipment at a rate many times greater than was possible with similar polymers of the prior art.

The favorable processing characteristics of the novel copolymers apparently are related to the exceptionally good film strength of the latter. Before curing the novel sympolymers can be pulled by hand to give strong thin films or long taffy-like threads whereas related diene-nitrile copolymers of the prior art have been known for their "shortness" in the raw state and their propensity to break after only slight elongation. It is surmised that the high film strength of the novel diene-nitrile rubbers is due to mutual dilution of the two polymer phases in the final copolymer whereby their intermolecular forces are greatly reduced to allow extensive slippage of the molecules whereas the intermolecular forces in ordinary diene-nitrile rubber alone are so great that rupture between aggregates of rubber molecules will occur almost as soon as any appreciable molecular slippage is brought about by external forces. The high film strength is apparently the principal factor responsible for the rapid dispersion of compounding ingredients such as carbon black in the novel copolymers since the aggregates of black become almost immediately enveloped by strong films of rubber without substantially disrupting the continuity of the later. In contrast, in the case of regular diene-nitrile polymers and most other synthetic rubbers the initial addition of carbon black causes a major disruption of the continuous rubber phase because the films of the rubber stock originally formed around the carbon black aggregates are too weak or too elastic and hence pull apart too easily, requiring more time and more energy to form a uniform dispersion of black in the rubber stock.

Another important as well as interesting aspect of the novel copolymers is their peculiar thermoplastic behavior. This is illustrated by the table below which summarizes a series of tests correlating deformation and recovery as a function of temperature, and comparing an ordinary commercial copolymer of butadiene and acrylonitrile (acrylonitrile content, 23%; Mooney viscosity, 45) with a sympolymer of the invention having the same total nitrile content and same Mooney viscosity. The test technique was substantially that described in Industrial and Engineering Chemistry, vol. 16, p. 362 (1924), using a parallel plate Williams plastometer with a 5 kg. weight and making readings at 3 minute deformation. In the table it will be understood that the larger the numerical value listed, the lower the total deformation, i. e., the less plastic the material.

*Table of thermoplastic behavior*

| Temperature, ° C. | Williams thermoplasticity—Recovery | |
|---|---|---|
| | Commercial copolymer | Sympolymer |
| 25 | 188–70 | 206–50 |
| 40 | 163–50 | 170–31 |
| 45 | 158–43 | 158–25 |
| 70 | 136–23 | 127–12 |
| 100 | 120–6 | 115–7 |

It can be seen that at temperatures below about 45° C. the novel sympolymers are more elastic and are therefore deformed less easily than the commercial copolymer prepared by the conventional process. In contrast, at temperatures above about 45° C. this behavior is reversed and the sympolymer is the more deformable material. Since milling operations are usually carried out at temperatures between 45° C. and 60° C., the thermoplasticity data indicate that the sympolymers can be hot milled at temperatures where they are more plastic than ordinary diene-nitrile copolymers, while at the same time the former give tougher rubber products after cooling than do the latter. Moreover the peculiar thermoplasticity of the sympolymers makes them especially suited for calendering operations.

Another characteristic of the sympolymers is their faster curing rate as compared with ordinary butadiene-acrylonitrile copolymers. The sympolymers can be vulcanized in accordance with a wide variety of recipes. For example, instead of the recipe described in Example 2, other recipes may be employed using other known vulcanizing agents or accelerators such as mercaptobenzothiazole, tetramethylthiuramdisulfide, the carbamates, amino compounds such as diphenyl guanidine, quinone dioxime compounds, as well as usual fillers, antioxidants, pigments and the like. Like ordinary butadiene-nitrile copolymers, the novel sympolymers can be blended with a variety of resins and rubbers. Particularly useful blends of the sympolymer have been prepared with polyvinyl resins such as the copolymer of about 95 percent vinyl chloride and about 5 percent vinyl acetate which is known as "Vinylite VYNW," the latter becoming plasticized by the sympolymer. As compared with ordinary butadiene-nitrile rubber, the sympolymers have an advantage in that they are easier to blend with the polyvinyl resin on a mill and the blends extrude at faster rates with lower swell and smoother surface.

The foregoing description contains a number of concrete examples embodying the present invention, particularly as applied to the preparation of diene-nitrile rubber blends. However, it will be understood that these examples are merely illustrations of the invention but not limitations thereof.

As indicated earlier herein, the novel co-synthesis process can be applied to other monomer systems than those specifically illustrated. For instance, one may use a conjugated diolefin in the first phase of the co-synthesis process, and add styrene instead of a nitrile at an intermediate conversion of the diolefinic charge. Or one may start with an initial mixture of monomers comprising both a conjugated diolefin and styrene, and add a third monomer such as acrylonitrile at the intermediate conversion point. Alternatively, in the systems illustrated or in analogues thereof, one may add more butadiene or other monomer corresponding to the initial charge when the other monomer such as acrylonitrile is being introduced into the system at the intermediate point of conversion.

Broadly speaking, the invention is applicable to the preparation of solid, high molecular weight polymers by a process comprising at least two polymerization steps. In the first step the monomer to be polymerized may consist of a conjugated diolefin of 4 to 6 carbon atoms, mixtures of several diolefins or mixtures of a diolefin containing minor amounts of other comonomers. After polymerization of the initial charge to about 5 to 80% conversion, 15 to 70% of another monomer not originally present in the reaction mixture is added thereto. After addition of the new monomer, the resulting monomeric mixture is polymerized to at least 50% conversion in the presence of polymer formed in the first step. The invention can be summed up as comprising an initial polymerization step wherein a diolefin monomer is polymerized to a conversion of about 10 to 80% to give essentially a diolefin homopolymer, followed by an addition of nitrile, styrene or other co-monomer to the partially polymerized initial reaction mixture, with or without further diolefin being added thereto at the same time, and thereafter continuing the polymerization in a second step in the presence of the initially formed homopolymer to form a copolymer having a diolefin content of about 90 to 50%; the monomer conversions or quantities of polymer formed in each of the respective steps being such that the homopolymer formed in the first step represents about 15 to 40% of the weight of total polymer formed in all steps of the polymerization reaction. Furthermore, where a three-component polymer is desired the first step may, for example, comprise the formation of a hydrocarbon copolymer of butadiene and styrene instead of the butadiene homopolymer, and the second step may comprise the formation of a copolymer of butadiene, styrene and acrylonitrile. Still other numerous variations of the invention described herein are possible without departing from the scope and spirit hereof.

The invention is particularly defined and claimed as follows:

1. A process for producing rubber-like polymers which comprises preparing an emulsion containing 100 parts of butadiene-1,3, 0.5 to 5 parts of an emulsifier, 150 to 400 parts of an aqueous medium which does not freeze at the polymerization temperature, up to 5 parts of acrylonitrile, 0.05 to 0.3 part of cumene hydroperoxide, and 0.2 to 0.6 part of a mercaptan of 6 to 18 carbon atoms, bringing the emulsion to a polymerization temperature between +20 and −20° C., adding to the emulsion an activator solution containing 0.2 to 0.35 part of ferric pyrophosphate, 0.5 to 1.5 part of sodium pyrophosphate decahydrate and 1 to 3 parts of reducing sugar, maintaining the resulting mixture at the polymerization temperature until about 15 to 30 percent of the butadiene charged is converted into a polymer having a Mooney viscosity between 1 and 50, adding to the partially polymerized reaction mixture 15 to 50 parts of acrylonitrile, continuing the polymerization of the resulting mixture to a conversion between 65 and 99%, and recovering the resulting rubber-like polymer from the mixture.

2. A process for producing a rubber-like polymer which comprises making up an emulsion containing 200 parts of water, 1 part of oleic acid, 0.13 part of sodium hydroxide, 2.8 parts of a sodium salt of a formaldehyde condensation product of naphthalene sulfonic acid, 0.4 part of a mixture of aliphatic mercaptans having between 6 and 18 carbon atoms per molecule, 0.3 part of potassium persulfate, 2.5 parts of acrylonitrile and 78 parts of butadiene-1,3, maintaining the emulsion at about 45° C. until about 23% of the charged monomers are converted to polymer, thereafter reducing the temperature of the partially polymerized mixture to about 35° C. and adding thereto 19.5 parts of acryonitrile monomer and 0.2 part of the said mercaptan mixture, continuing the polymerization of the resulting mixture at the reduced temperature to a conversion of about 50%, thereafter adding a further amount of 0.2 part of the said mercaptan mixture and continuing the polymerization to a conversion of about 75%, and finally recovering the resulting polymer from the reaction mixture.

3. A product produced by the process of claim 1.

4. A product produced by the process of claim 2.

5. A process for producing rubber-like copolymers which comprises emulsifying 100 parts by weight of a conjugated diolefin of 4 to 6 carbon atoms and up to 5 parts by weight of a nitrile selected from the group consisting of acrylonitrile, alpha methacrylonitrile, alpha ethacrylonitrile, and alpha chloracrylonitrile, in an aqueous medium, partially polymerizing the emulsified monomer in the presence of an oxygen-liberating catalyst until at least 10% of the total diolefin charged is converted to polymer, adding to the partially polymerized reaction mixture in not more than one portion, further nitrile in a ratio to give a final polymer product having a combined average nitrile content of from 10 to 50% based on the combined diolefin, and continuing the polymerization of the resulting mixture to a conversion of at least 50%.

6. A product produced according to the process of claim 5.

7. A process for producing rubber-like copolymers which comprises emulsifying 100 parts of a conjugated diolefin of 4 to 6 carbon atoms and up to 5 parts by weight of acrylonitrile in an aqueous medium, maintaining the emulsion at a temperature between 30° C. and 50° C., partially polymerizing the emulsified monomer in the presence of from 0.03 to 2 parts of an oxygen-liberating alkali per-salt catalyst and 0.5 to 1.5 parts of an aliphatic mercaptan of 6 to 18 carbon atoms until from 15 to 35% of the diolefin is converted into a rubber-like polymer, adding to the partially polymerized reaction mixture in not more than one portion, between 15 and 60 parts of acryonitrile, continuing the polymerization of the resulting mixture to a conversion of 65 to 85%, and recovering the resulting rubber-like polymer product therefrom.

8. A product produced according to the process of claim 7.

9. A process for producing rubber-like polymers which comprises preparing an emulsion of 100 parts of butadiene-1,3, 150 to 400 parts of water and up to 5 parts of acrylonitrile, adding to the emulsion 0.3 to 0.5 part of potassium persulfate and 0.2 to 0.8 part of a mercaptan polymerization modifier consisting of a major proportion of aliphatic mercaptans in the $C_6$ to $C_{18}$ range, maintaining the emulsion at about 45° C. until about 15 to 35% of the butadiene has been converted into polymer, reducing the temperature of the partially polymerized mixture to about 35° C., adding thereto in one portion 15 to 60 parts of acrylonitrile and 0.1 to 0.5 part of the mercaptan, continuing the polymerization of the resulting mixture to a total conversion of 40 to 70% and adding thereto from 0.1 to 0.5 part of the mercaptan, and further continuing the polymerization to a conversion of 65 to 85%, and recovering the resulting polymer product therefrom.

10. A product produced by the process of claim 9.

FRED W. BANES.
ERVING ARUNDALE.

REFERENCES CITED

The following references are of record in the file of this patent:

UNITED STATES PATENTS

| Number | Name | Date |
|---|---|---|
| 2,317,859 | Soday | Apr. 27, 1943 |
| 2,384,547 | Fryling | Sept. 11, 1945 |
| 2,444,870 | Clifford | July 6, 1948 |
| 2,460,300 | Le Fevre et al. | Feb. 1, 1949 |
| 2,554,268 | Rose et al. | May 22, 1151 |

FOREIGN PATENTS

| Number | Country | Date |
|---|---|---|
| 492,998 | Great Britain | Sept. 30, 1938 |
| 609,012 | Great Britain | Sept. 23, 1948 |

OTHER REFERENCES

Semon Chem. and Eng. News Nov. 10, 1946, pp. 2900 and 2903.